United States Patent [19]
Krishnamurthy

[11] Patent Number: 5,096,470
[45] Date of Patent: Mar. 17, 1992

[54] HYDROGEN AND CARBON MONOXIDE PRODUCTION BY HYDROCARBON STEAM REFORMING AND PRESSURE SWING ADSORPTION PURIFICATION

[75] Inventor: Ramachandran Krishnamurthy, Piscataway, N.J.

[73] Assignee: The BOC Group, Inc., Murray Hill, N.J.

[21] Appl. No.: 622,872

[22] Filed: Dec. 5, 1990

[51] Int. Cl.⁵ ............................................. B01D 53/04
[52] U.S. Cl. ......................................... 55/26; 55/31; 55/58; 55/62; 55/68; 55/74; 55/75
[58] Field of Search ............... 55/25, 26, 58, 62, 68, 55/74, 75, 31, 33, 35

[56] References Cited

U.S. PATENT DOCUMENTS

| Re. 31,014 | 8/1982 | Sircar | 55/26 |
|---|---|---|---|
| 2,944,627 | 7/1960 | Skarstrom | 55/62 X |
| 3,150,942 | 9/1964 | Vasan | 55/62 X |
| 4,171,207 | 10/1979 | Sircar | 55/26 |
| 4,726,816 | 2/1988 | Fuderer | 55/62 X |
| 4,732,577 | 3/1988 | Koizumi et al. | 55/25 X |
| 4,790,858 | 12/1988 | Sircar | 55/26 |
| 4,813,980 | 3/1989 | Sircar | 55/26 |
| 4,836,833 | 6/1989 | Nicholas et al. | 55/26 X |
| 4,846,851 | 7/1989 | Guro et al. | 55/26 |
| 4,861,351 | 8/1989 | Nicholas et al. | 55/26 X |
| 4,869,894 | 9/1989 | Wang et al. | 55/26 X |
| 4,913,709 | 4/1990 | Kumar | 55/26 |
| 4,914,218 | 4/1990 | Kumar et al. | 55/26 |
| 4,963,339 | 10/1990 | Krishnamurthy et al. | 55/62 X |
| 4,985,052 | 1/1991 | Haruna et al. | 55/26 |

FOREIGN PATENT DOCUMENTS

| 0367618 | 5/1990 | European Pat. Off. | 55/25 |
|---|---|---|---|
| 60-078613 | 5/1985 | Japan | 55/25 |

Primary Examiner—Robert Spitzer
Attorney, Agent, or Firm—Robert I. Pearlman; Coleman R. Reap

[57] ABSTRACT

The present invention is directed to a method for producing hydrogen and carbon monoxide from a feed mixture comprising hydrogen, carbon monoxide, carbon dioxide, and methane by (a) passing the feed mixture through a first pressure swing adsorption system comprising an adsorbent having a greater affinity for carbon dioxide, methane, and carbon-monoxide than for hydrogen, to separate hydrogen from the carbon dioxide, methane, and carbon monoxide, (b) desorbing carbon monoxide, (c) desorbing carbon dioxide and methane, (d) passing the carbon monoxide to a second pressure swing adsorption system comprising an adsorbent having a greater affinity for carbon monoxide than for hydrogen, carbon dioxide, and methane to separate the carbon monoxide from hydrogen, carbon dioxide, and methane, and (e) desorbing carbon monoxide from the adsorbent. In a second embodiment, the invention is directed to a method which comprises (a) pressure swing adsorption in a first stage comprising an adsorbent having a greater affinity for carbon monoxide than for hydrogen, carbon dioxide, and methane, and pressure swing adsorption in a second stage comprising an adsorbent having a greater affinity for carbon dioxide, methane, and carbon monoxide than for hydrogen.

28 Claims, 5 Drawing Sheets

HYDROGEN AND CARBON MONOXIDE PRODUCTION BY HYDROCARBON STEAM REFORMING AND PRESSURE SWING ADSORPTION PURIFICATION

BACKGROUND OF THE INVENTION

1. Field of the Invention

The present invention is directed to a method for producing merchant grade hydrogen and carbon monoxide from a steam reformed hydrocarbon feed mixture. More particularly, the present invention is directed to a method for producing hydrogen and carbon monoxide from a feed mixture comprising hydrogen, carbon monoxide, carbon dioxide, and methane.

2. Description of the Prior Art

Various methods are known for separating gaseous mixtures produced by the steam reforming of hydrocarbons. Steam reforming to produce hydrogen consists of treating a hydrocarbon feed mixture with steam in a catalytic steam reactor (reformer) which consists of a number of tubes placed in a furnace at a temperature in the range from about 1250° F. to about 1700° F. The reversible reforming reactions which occur when methane is used as the hydrocarbon feed mixture are set out below.

$$CH_4 + H_2O = CO + 3H_2$$

$$CH_4 + 2H_2O = CO_2 + 4H_2$$

$$CO + H_2O = CO_2 + H_2$$

Carbon monoxide and carbon dioxide are generally removed by shift conversion (reaction of carbon monoxide with steam to form additional hydrogen and carbon dioxide), absorption in amines or other alkaline solvents (carbon dioxide removal), and methanation (conversion of trace carbon monoxide and carbon dioxide to methane). When carbon monoxide is a desired product, the shift conversion and methanation steps are not employed.

The hydrogen-rich gas mixture exiting the steam reformer consists of an equilibrium mixture of hydrogen, carbon monoxide, carbon dioxide, water vapor, and unreacted methane. The reforming reactions are endothermic and therefore hydrocarbons and process waste gases are burned in the reformer furnace to provide the endothermic heat.

Hydrocarbon steam reforming reactions and hydrogen separation processes are disclosed in more detail in "Ammonia and Synthesis Gas: Recent and Energy Saving Processes", Edited by F.J. Brykowski, Chemical Technology Review No. 193, Energy Technology Review No. 68, Published by Noyes Data Corporation, Park Ridge, New Jersey, 1981, which disclosure is incorporated herein by reference.

Conventional methods for recovering hydrogen and carbon monoxide from a hydrocarbon steam reformed feed mixture have generally focused on cryogenic distillation processes to separate and purify hydrogen and carbon monoxide in the mixture after carbon dioxide is removed. Cryogenic separation processes tend to have a high capital cost especially when more than one pure product is required.

U.S. Pat. No. 4,778,670, issued to Pinto, discloses a pressure swing adsorption process for producing technical hydrogen which comprises passing a raw gas containing a specific ratio of hydrogen, nitrogen, and carbon oxides to a pressure swing adsorbent and stopping the flow of feed gas in the cycle when the integrated nitrogen content of the unadsorbed product gas of the pressure swing adsorption stage is in the range of 1% to 10% by volume.

German patent application no. 3,427,804, to Linde A.G., discloses a process for reforming a hydrocarbon with carbon dioxide to obtain a gas mixture comprising hydrogen, carbon monoxide, and carbon dioxide and separating the mixture into separate streams of hydrogen, carbon monoxide, and carbon dioxide. The methods for purifying the hydrogen and carbon monoxide streams are not disclosed.

Methods for separating hydrogen and carbon monoxide by pressure swing adsorption processes are disclosed in European patent application no. 317,235A2, to Krishnamurthy et al, and the references cited therein. Krishnamurthy et al. discloses a method for forming hydrogen and carbon monoxide from a feed mixture exiting a hydrocarbon steam reformer comprising hydrogen, carbon monoxide, and carbon dioxide. The method comprises the steps of passing the feed mixture through a sorptive separation to separate a hydrogen product, a carbon monoxide-rich product, and a carbon dioxide-rich product. The carbon monoxide-rich product is further purified in a two stage pressure swing adsorption system. The first stage comprises an activated carbon adsorbent which removes carbon monoxide and methane as the strongly adsorbed waste stream. The second stage comprises a zeolite adsorbent and produces a pure carbon monoxide stream as an adsorbed product.

U.S. Pat. No. 4,917,711, issued to Xie et al., discloses an adsorbent for carbon monoxide and unsaturated hydrocarbons which comprises a high surface area support, such as a zeolite, alumina, silica gel, aluminosilicate, or aluminophosphate, and cuprous or cupric compound. The adsorbent may be used to separate carbon monoxide and unsaturated hydrocarbons from a gaseous mixture containing hydrogen, nitrogen, argon, helium, methane, ethane, propane, and carbon dioxide by passing the mixture through the adsorbent and releasing the adsorbed carbon monoxide by heating, or lowering the pressure of, the adsorbent.

Japanese patent JP01203019 discloses a four column pressure swing adsorption system for separating carbon monoxide from a gaseous mixture. The columns contain an adsorbent containing copper to adsorb carbon monoxide gas.

U.S. Pat. No. 4,914,076, issued to Tsuji et al., discloses a method for preparing an adsorbent for carbon monoxide which comprises contacting an alumina or silica-alumina support with a mixed solution or dispersion of a copper (II) salt and a reducing agent, and then removing the solvent.

U.S. Pat. No. 4,783,433, issued to Tajima et al., discloses an adsorbent for separating carbon monoxide from a gaseous mixture containing carbon dioxide which comprises a zeolite resin with a silica/alumina ratio of not more than 10, in which not less than 50% of the cation exchange sites have been replaced by Cu(I) ions, in the pores of which, one or more salts of the metals Cu(I), Fe, Zn, Ni, and or Mg are dispersed.

Japanese patent JP61242908 discloses an adsorbent for carbon monoxide which is prepared by supporting a copper (I) compound on an activated carbon support wherein the volume of pores having a diameter of under 10 angstroms is under 0.33 ml/g.

U.S. Pat. No. 4,743,276, issued to Nishida et al., discloses an adsorbent for carbon monoxide which comprises a zeolite resin with a silica/alumina ratio of not more than 10, in which not less than 50% of the cation exchange sites have been replaced by Cu(I) ions, in the pores of which, one or more salts of the metals Cu(I), Fe, Zn, Ni, and or Mg are dispersed.

In a pressure swing adsorption system (PSA), a gaseous mixture is passed at an elevated pressure through a bed of an adsorbent material which selectively adsorbs one or more of the components of the gaseous mixture. Product gas, enriched in the unadsorbed gaseous component(s), is then withdrawn from the bed.

The term "gaseous mixture", as used herein, refers to a gaseous mixture, such as air, primarily comprised of two or more components having different molecular size. The term "enriched gas" refers to a gas comprised of the component(s) of the gaseous mixture relatively unadsorbed after passage of the gaseous mixture through the adsorbent bed. The enriched gas generally must meet a predetermined purity level, for example, from about 90% to about 99%, in the unadsorbed component(s). The term "lean gas" refers to a gas exiting from the adsorption bed that fails to meet the predetermined purity level set for the enriched gas. When the strongly adsorbed component is the desired product, a cocurrent depressurization step and a cocurrent purge step of the strongly adsorbed component are added to the process.

The term "adsorption bed" refers either to a single bed or a serial arrangement of two beds. The inlet end of a single bed system is the inlet end of the single bed while the inlet end of the two bed system (arranged in series) is the inlet end of the first bed in the system. The outlet end of a single bed system is the outlet end of the single bed and the outlet end of the two bed system (arranged in series) is the outlet end of the second bed in the system. By using two adsorption beds in parallel in a system and by cycling (alternating) between the adsorption beds, product gas can be obtained continuously.

As a gaseous mixture travels through a bed of adsorbent, the adsorbable gaseous components of the mixture enter and fill the pores of the adsorbent. After a period of time, the composition of the gas exiting the bed of adsorbent is essentially the same as the composition entering the bed. This period of time is known as the breakthrough point. At some time prior to this breakthrough point, the adsorbent bed must be regenerated. Regeneration involves stopping the flow of gaseous mixture through the bed and purging the bed of the adsorbed components generally by venting the bed to atmospheric or subatmospheric pressure.

A pressure swing adsorption system generally employs two adsorbent beds operated on cycles which are sequenced to be out of phase with one another by 180° so that when one bed is in the adsorption or production step, the other bed is in the regeneration step. The two adsorption beds may be connected in series or in parallel. In a serial arrangement, the gas exiting the outlet end of the first bed enters the inlet end of the second bed. In a parallel arrangement, the gaseous mixture enters the inlet end of all beds comprising the system. Generally, a serial arrangement of beds is preferred for obtaining a high purity gas product and a parallel arrangement of beds is preferred for purifying a large quantity of a gaseous mixture in a short time cycle.

Between the adsorption step and the regeneration step, the pressure in the two adsorption beds is generally equalized by connecting the inlet ends of the two beds together and the outlet ends of the two beds together. During the pressure equalization step, the gas within the pores of the adsorption bed which has just completed its adsorption step (under high pressure) flows into the adsorption bed which has just completed its regeneration step (under low pressure) because of the pressure differential which exists between the two beds. The adsorption bed which completed its adsorption step is depressurized and the adsorption bed which completed its regeneration step is repressurized. This pressure equalization step improves the yield of the product gas because the gas within the pores of the bed which has just completed its adsorption step has already been enriched. When more than two beds are employed in the adsorption system, it is common to have a number of pressure equalizations steps.

Gas separation by the pressure swing adsorption method is more fully described in, for example, "Gas Separation by Adsorption Processes", Ralph T. Yang, Ed., Chapter 7, "Pressure Swing Adsorption: Principles and Processes" Butterworth 1987, and in U.S. Pat. Nos. 2,944,627, 3,801,513, and 3,960,522, which disclosures are incorporated by reference herein. Modifications and improvements in the pressure swing adsorption process and apparatus are described in detail in, for example, U.S. Pat. Nos. 4,415,340 and 4,340,398, which disclosures are incorporated by reference herein.

While the above methods disclose processes for separating carbon monoxide, none of the methods disclose satisfactory processes for recovering both hydrogen and carbon monoxide from a hydrocarbon steam reformed feed mixture economically and in high purity. Methods for separating hydrogen and carbon monoxide from a hydrocarbon steam reformed feed mixture require multi-stage systems to purify carbon monoxide. Methods for separating carbon monoxide using copper exchanged sieves have focused on the separation of waste gases from steel mills which contain nitrogen, carbon monoxide, and carbon dioxide but not hydrogen. Conventional cryogenic separation processes tend to have a high capital cost especially when more than one pure product is required. The present invention provides an improved method for producing hydrogen and carbon monoxide from a hydrocarbon steam reformed feed mixture employing a novel combination of pressure swing adsorption methods which minimizes capital cost requirements and increases the recovery of carbon monoxide.

SUMMARY OF THE INVENTION

The present invention is directed to a method for producing hydrogen and carbon monoxide from a feed mixture comprising hydrogen, carbon monoxide, carbon dioxide, and methane, which comprises the steps of (a) passing the feed mixture through a first pressure swing adsorption system containing an adsorption bed comprising an adsorbent having a greater affinity for carbon dioxide, methane, and carbon monoxide than for hydrogen to separate hydrogen as a pure non-adsorbed product and carbon dioxide, methane, and carbon monoxide as an adsorbed fraction, (b) desorbing carbon monoxide from the pressure swing adsorption system in step (a) to form a carbon monoxide-rich fraction, (c)

desorbing carbon dioxide and methane from the pressure swing adsorption system in step (a) to form a carbon dioxide-rich fraction, (d) passing the carbon monoxide-rich fraction from step (b) to a second pressure swing adsorption system containing an adsorption bed comprising an adsorbent having a greater affinity for carbon monoxide than for hydrogen, carbon dioxide, and methane to separate carbon monoxide as an adsorbed fraction and hydrogen, carbon dioxide, and methane as a non-adsorbed fraction, and (e) desorbing carbon monoxide from the pressure swing adsorption system in step (d) to form a pure carbon monoxide product.

In a second embodiment, the invention is directed to a method for producing hydrogen and carbon monoxide from a feed mixture comprising hydrogen, carbon monoxide, carbon dioxide, and methane, which comprises the steps of (a) providing a pressure swing adsorption system having a first stage and a second stage, wherein the first stage contains an adsorption bed comprising an adsorbent having a greater affinity for carbon monoxide than for hydrogen, carbon dioxide, and methane, the second stage contains an adsorption bed comprising an adsorbent having a greater affinity for carbon dioxide, methane, and carbon monoxide than for hydrogen, and the first and second stages are connected in series and each stage contains an inlet end and an outlet end, (b) passing the feed mixture through the first stage of the pressure swing adsorption system to separate carbon monoxide as an adsorbed fraction and hydrogen, carbon dioxide, and methane as a non-adsorbed fraction, (c) passing the non-adsorbed fraction from step (b) through the second stage of the pressure swing adsorption system to separate carbon dioxide and methane as an adsorbed fraction and hydrogen as a non-adsorbed pure product, (d) desorbing carbon dioxide and methane from the first and second stages of the pressure swing adsorption system to form a carbon dioxide-rich fraction, and (e) desorbing carbon monoxide from the first stage of the pressure swing adsorption system to form a pure carbon monoxide product.

DETAILED DESCRIPTION OF THE INVENTION

Figure 1:
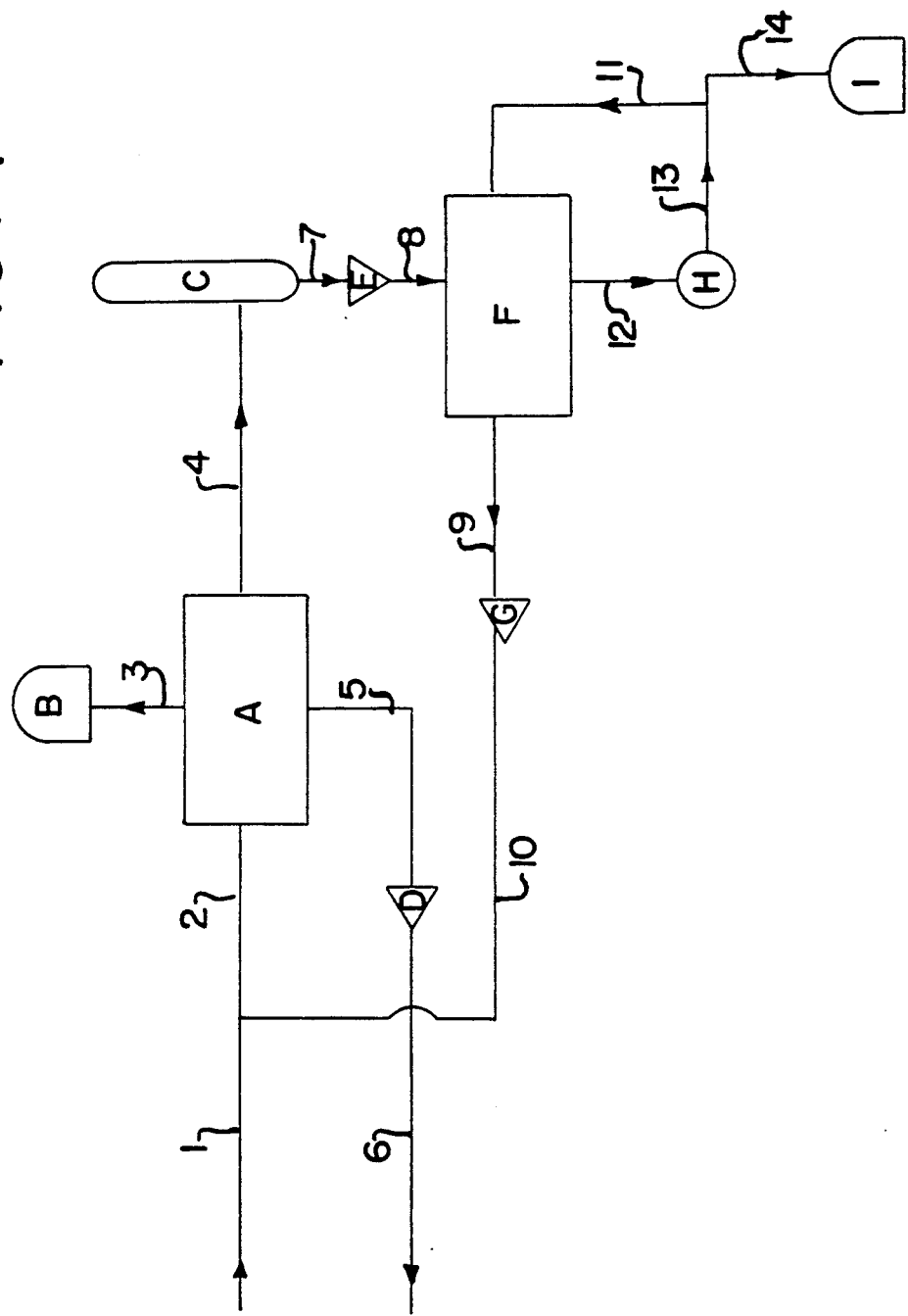
FIG. 1 is a schematic process flow diagram illustrating a novel combination of pressure swing adsorption systems according to the present invention to separate hydrogen and carbon monoxide from a feed mixture comprising hydrogen, carbon monoxide, carbon dioxide, and methane.

Applicant has discovered a method for separating hydrogen and carbon monoxide from a feed mixture comprising hydrogen, carbon monoxide, carbon dioxide, and methane. In a preferred embodiment, a novel combination of non-cryogenic separation steps is utilized which efficiently and economically yields enriched hydrogen and carbon monoxide in high purity and yield from a feed mixture exiting a hydrocarbon steam reformer. In a first preferred embodiment, the combination of non-cryogenic steps comprises two pressure swing adsorption systems. The first pressure swing adsorption system separates hydrogen from the feed mixture as a pure non-adsorbed product and carbon dioxide, methane, and carbon monoxide as an adsorbed fraction. The adsorbed fraction is then desorbed and passed to a second pressure swing adsorption system. The second pressure swing adsorption system separates carbon monoxide as an adsorbed fraction and hydrogen, carbon dioxide, and methane as a nonadsorbed fraction.

In a second embodiment, a novel two stage pressure swing adsorption system is utilized which efficiently and economically yields enriched hydrogen and carbon monoxide. The first stage of the pressure swing adsorption system separates carbon monoxide as an adsorbed fraction and hydrogen, carbon dioxide, and methane as a non-adsorbed fraction. The second stage of the pressure swing adsorption system separates carbon dioxide and methane as an adsorbed fraction and hydrogen as a non-adsorbed pure product.

The novel combination of pressure swing adsorption separation methods of the present invention provides significant savings in capital and operating expense over completely cryogenic methods. The steps in the present method may be integrated into steps in the hydrocarbon steam reformer method to enhance the reforming process. For example, the carbon dioxide-rich fraction from the first pressure swing adsorption system in the first embodiment or the second stage in the second embodiment may be recycled and used as fuel in the hydrocarbon steam reformer, further increasing the concentration of carbon monoxide in the feed mixture. The hydrogen-rich fraction from the second pressure swing adsorption system in the first embodiment may also be recycled into the first pressure swing adsorption system to separate additional carbon monoxide.

The feed mixture (exhaust gas, effluent gas, exit gas, feed gas) in the present invention is a mixture comprising hydrogen, carbon monoxide, carbon dioxide, and methane. Preferably, the feed mixture is an effluent gas from a hydrocarbon steam reformer. The feed mixture will in general comprise hydrogen in an amount up to about 80%, carbon monoxide in an amount up to about 20%, carbon dioxide in an amount up to about 30%, and methane in an amount up to about 3%.

The feed mixture is typically available in a saturated state and may be dried by passing the mixture through a condenser (drier) containing a desiccant such as alumina, silica, or zeolite. Desorption of the water from the desiccant may be accomplished by purging the desiccant with a dry waste purge gas (such as the carbon dioxide-rich fraction or nitrogen gas). Any water remaining in the feed mixture is removed with the strongly adsorbed stream (carbon dioxide-rich fraction). After being dried, the feed mixture may be compressed prior to passage of the mixture into the pressure swing adsorption system.

The feed mixture from the hydrocarbon steam reformer will first be passed through a process cooler to cool the gas and condense and remove water vapor. To maximize the carbon monoxide concentration and minimize the carbon dioxide concentration in the feed mixture, the hydrocarbon steam reformed feed mixture will by-pass the shift converter.

A typical feed mixture from a hydrocarbon steam reformer will have a pressure in the range from about 150 psia to about 600 psia, preferably from about 150 psia to about 400 psia, and more preferably from about 150 psia to about 300 psia. Generally the feed mixture will be available at a pressure sufficiently high to be used directly in the first pressure swing adsorption system. Optionally, a compressor may be employed to compress the feed mixture to the required pressure for the pressure swing adsorption system.

The adsorbent material in the adsorbent bed in the hydrogen pressure swing adsorption system (first pressure swing adsorption system in the first embodiment and second stage in the pressure swing adsorption system in the second embodiment) is an adsorbent having a greater affinity for carbon dioxide, methane, and carbon monoxide than for hydrogen. The adsorbent material may be a molecular sieve or activated carbon, and preferably is a combination of molecular sieves and activated carbon. Both calcium and sodium aluminosilicate zeolites may be employed. Carbon molecular sieves and silica molecular sieves are also useful. Suitable zeolite sieves include, but are not limited to, the type 5A, 10X, 13X zeolite molecular sieves, and mordenites. Preferred zeolite sieves are the type 5A zeolite sieves and molecular sieves with comparable pore size and molecular attraction.

The adsorbent material in the adsorbent bed in the carbon monoxide pressure swing adsorption system (second pressure swing adsorption system in the first embodiment and first stage in the pressure swing adsorption system in the second embodiment) is an adsorbent having a greater affinity for carbon monoxide than for hydrogen, carbon dioxide, and methane. In general, suitable adsorbent materials are copper exchanged substrates such as those selected from the group consisting of copper exchanged Y-type aluminosilicate zeolite molecular sieves, copper exchanged alumina, and copper exchanged activated carbon, and mixtures thereof. In a preferred embodiment, the adsorbent material is copper aluminosilicate zeolite molecular sieve material, available under the tradename NKK type adsorbent in a package from Nippon Kokan K. K., Tokyo, Japan. Copper aluminosilicate zeolite molecular sieves can be prepared by exchanging sodium in sodium aluminosilicate zeolite molecular sieves with copper (2+) followed by a heating and reducing treatment to enhance the affinity of the adsorbent for carbon monoxide and reduce the affinity of the adsorbent for carbon dioxide. Copper exchanged supports, and methods for preparing such supports, are described in detail in U.S. Pat. No. 4,917,711, Japanese patent JP01203019, U.S. Pat. No. 4,914,076, U.S. Pat. No. 4,783,433, Japanese patent JP61242908, and U.S. Pat. No. 4,743,276, which references are described above and are incorporated herein by reference.

In accord with the present invention, a hydrogen gas product can be prepared having a purity of greater than about 99%, preferably greater than about 99.99%, and more preferably greater than about 99.999%. A carbon monoxide gas product can be prepared having a purity of greater than about 98%, preferably greater than about 99%, and more preferably greater than about 99.85%.

The method for producing hydrogen and carbon monoxide from a feed mixture comprising hydrogen, carbon monoxide, carbon dioxide, and methane can be better understood by reference to the FIGURES in which like numerals refer to like parts of the invention throughout the FIGURES. Although the present invention is described and illustrated in connection with preferred embodiments, applicant intends that modifications and variations may be used without departing from the spirit of the present invention.

FIG. 1 illustrates a preferred first embodiment of the present invention for producing hydrogen and carbon monoxide from a feed mixture comprising hydrogen, carbon monoxide, carbon dioxide, and methane by a combination of pressure swing adsorption steps. In FIG. 1, gaseous feed mixture is fed through feed conduits 1 and 2 to hydrogen (first) pressure swing adsorption system A to separate the mixture. Typically the feed mixture from the hydrocarbon steam reformer will enter hydrogen pressure swing adsorption system A at a pressure in the range from about 150 psia to about 600 psia, preferably from about 150 psia to about 400 psia, and more preferably from about 150 psia to about 300 psia. Optionally a compressor may be employed to compress the feed mixture to the pressure swing adsorption pressure. After being cooled, the feed mixture entering hydrogen pressure swing adsorption system A will be at ambient temperature.

During the hydrogen product production step, feed mixture is fed into and hydrogen product is withdrawn from hydrogen pressure swing adsorption system A. Hydrogen product is separated as a pure non-adsorbed product and carbon monoxide, carbon dioxide, methane, and water vapor are separated as an adsorbed fraction. Hydrogen product (merchant grade, less than about 10 vpm impurities) is withdrawn from hydrogen pressure swing adsorption system A through feed conduit 3 and passed to hydrogen reservoir B.

After the hydrogen product production step, hydrogen pressure swing adsorption system A undergoes a pressure equalization step and an intermediate depressurization step (carbon monoxide-rich fraction production step). During the carbon monoxide-rich fraction production step, a carbon monoxide-rich fraction is desorbed and withdrawn from hydrogen pressure swing adsorption system A via feed conduit 4 and passed to carbon monoxide storage vessel C.

After the carbon monoxide rich fraction production step, hydrogen pressure swing adsorption system A undergoes a depressurization step and a hydrogen product gas purge step (carbon dioxide-rich fraction production steps). In the first carbon dioxide-rich fraction production step, a carbon dioxide-rich fraction is withdrawn by depressurizing hydrogen pressure swing adsorption system A. In the second carbon dioxide-rich fraction production step, a carbon dioxide-rich fraction is withdrawn by purging hydrogen pressure swing adsorption system A with hydrogen product gas. The carbon dioxide-rich fractions are withdrawn via feed conduit 5 and passed to carbon dioxide compressor D. Carbon dioxide compressor D compresses the carbon dioxide-rich fractions to the steam reforming pressure. The compressed carbon dioxide-rich fractions from carbon dioxide compressor D are then passed through feed conduit 6 to the hydrocarbon steam reformer for recycle as reformer feed gas to enrich the carbon monoxide content of the reformer product gas. In general, carbon dioxide compressor D will compress the carbon dioxide-rich fraction to a pressure in the range from about 150 psia to about 600 psia, preferably from about 150 psia to about 450 psia, and more preferably from about 150 psia to about 350 psia.

The carbon monoxide-rich fraction in carbon monoxide storage vessel C is passed to carbon monoxide compressor E via feed conduit 7. Carbon monoxide compressor E compresses the carbon monoxide-rich fraction to the separation pressure. In general, carbon monoxide compressor E will compress the carbon monoxide-rich fraction to a pressure in the range from about 20 psia to about 600 psia, preferably from about 20 psia to about 200 psia, and more preferably from about 20 psia to about 100 psia. Compressed carbon monoxide-rich fraction is then passed from carbon monoxide compressor E to carbon monoxide (second) pressure swing adsorption system F via feed conduit 8 to further separate the mixture. The feed gas in feed conduit 8 may be available at temperatures ranging from about ambient to about 150° F.

During the carbon monoxide adsorption step, carbon monoxide-rich feed mixture is fed into, and carbon dioxide, methane, water vapor, and any remaining hydrogen is withdrawn from, carbon monoxide pressure swing adsorption system F. Carbon monoxide is separated as an adsorbed product and carbon dioxide, methane, any water vapor, and any hydrogen are separated as a non-adsorbed fraction. The carbon dioxide, methane, water vapor, and hydrogen non-adsorbed fraction is withdrawn from carbon monoxide pressure swing adsorption system F through feed conduit 9 to recycle compressor G. Recycle compressor G compresses the non-adsorbed gases to the hydrogen pressure swing adsorption separation pressure. In general, the recycle compressor G will compress the non-adsorbed gases to a pressure in the range from about 150 psia to about 600 psia, preferably from about 150 psia to about 400 psia, and more preferably from about 150 psia to about 310 psia. The compressed non-adsorbed gases from recycle compressor G are then recycled to hydrogen pressure swing adsorption system A through feed conduits 10 and 2.

After the carbon monoxide adsorption step, carbon monoxide pressure swing adsorption system F undergoes a pressure equalization step, a carbon monoxide product gas purge step, and a carbon monoxide product production step (a vacuum desorption step). During the pressure equalization step, a portion of the void gas, which contains mainly non-adsorbed gaseous impurities, is withdrawn from the outlet (top) end of the bed being depressurized and passed to the outlet (top) end of the bed being pressurized to enrich the depressurized bed in the adsorbed carbon monoxide component. During the carbon monoxide product gas purge step, carbon monoxide is introduced through conduit 11 into the inlet (bottom) end of the depressurized bed in a cocurrent direction to purge and force remaining non-adsorbed gaseous impurities to the outlet (top) end of the bed and into the purge exhaust gas recycle tank L (see FIG. 3) for recycle into the feed gas. During the carbon monoxide product production step, carbon monoxide is desorbed and withdrawn from the inlet (bottom) end of carbon monoxide pressure swing adsorption system F via feed conduits 12, 13 and 14 by applying vacuum from vacuum pump H via feed conduit 12. The carbon monoxide product (merchant grade, less than about 1500 vpm impurities) is passed through feed conduits 12, 13, and 14 to carbon monoxide reservoir I.

Figure 2:
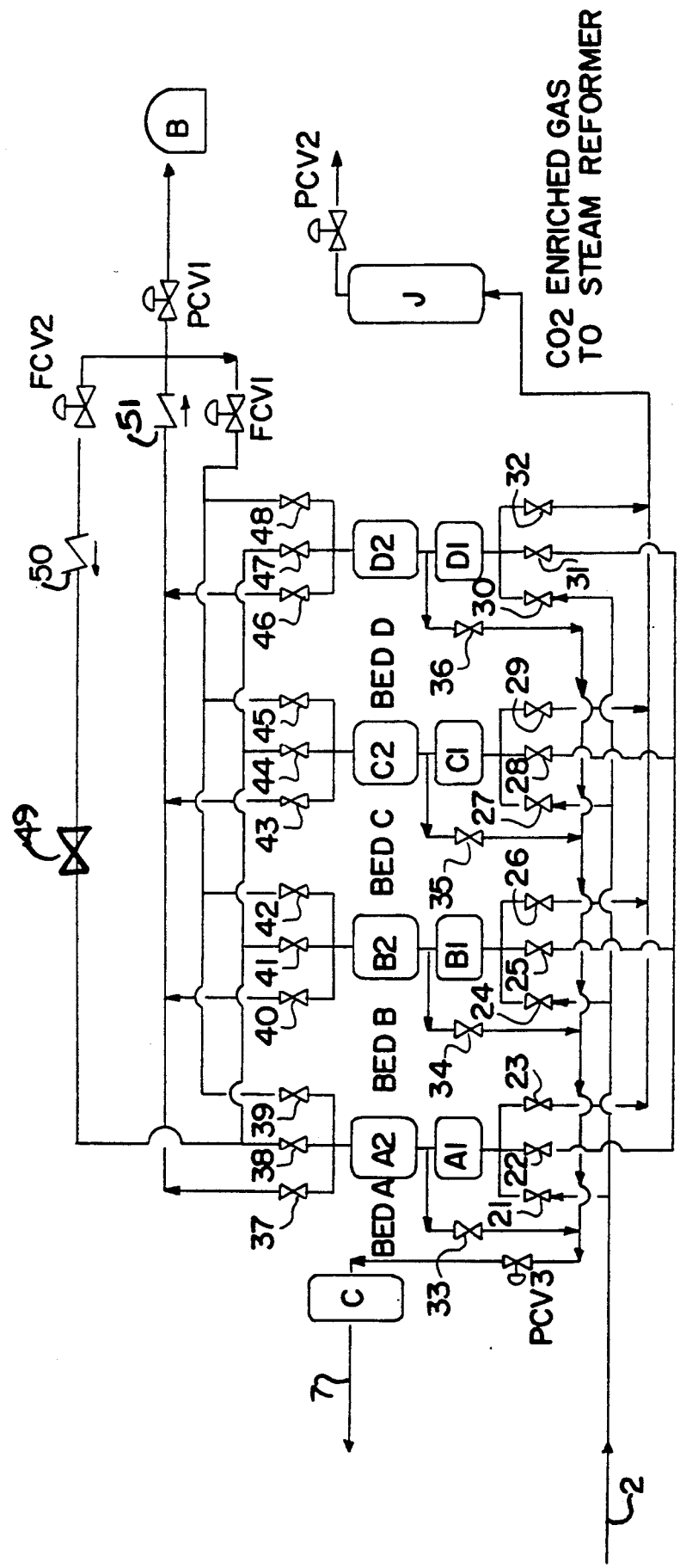
FIG. 2 is a schematic process flow diagram illustrating a first pressure swing adsorption method for separating hydrogen as a non-adsorbed product and carbon monoxide, carbon dioxide, and methane as an adsorbed fraction, according to the present invention.

FIG. 2 illustrates a first (hydrogen separation) pressure swing adsorption system for separating hydrogen from a feed mixture comprising hydrogen, carbon monoxide, carbon dioxide, and methane according to the present invention. As set out in FIG. 1, the feed mixture from the hydrocarbon steam reformer is passed through feed conduits 1 and 2 to hydrogen pressure swing adsorption system A.

In FIG. 2, the hydrogen pressure swing adsorption system A comprises adsorption beds A, B, C, and D, carbon monoxide storage vessel C, carbon dioxide-rich gas buffer vessel J, hydrogen product reservoir B, hydrogen product pressure control valve PCV1, carbon dioxide-rich fuel gas pressure control valve PCV2, carbon monoxide product pressure control valve PCV3, repressurization flow control valve FCV1, hydrogen product purge gas flow control valve FCV2, stop valves 21 through 49, and non-return valves 50 and 51.

Adsorption beds A through D are connected in parallel. Each of the adsorption beds, A through D, is physically divided into two bed parts, a first adsorption bed and a second adsorption bed, A1/A2, B1/B2, C1/C2, and D1/D2, respectively, which are connected in series. Each adsorption bed contains an inlet (feed, bottom) end and an outlet (discharge, top) end. The two part adsorption beds facilitate removal of a carbon monoxide stream from an intermediate position in the bed. The carbon monoxide stream is drawn at an intermediate pressure, for example at about 25 psia, and passed to carbon monoxide storage vessel C. The adsorbent bed comprises an adsorbent having a greater affinity for carbon dioxide, methane, and carbon monoxide than for hydrogen. For example, the first adsorption bed (for example, bed A1) comprises an activated carbon adsorbent material and the second adsorption bed (for example, bed A2) comprises a lower level of an activated carbon adsorbent material and an upper level of a zeolite molecular sieve adsorbent.

The first (hydrogen separation) pressure swing adsorption system is operated in accordance with the full cycle sequence shown in Table 1. The sequence is described below in detail using beds A1/A2. Beds B1/B2, C1/C2, and D1/D2 are employed in the same sequence but at an offset as shown in Table 1. All stop valves may be controlled automatically on a predetermined schedule.

TABLE 1

| Four Bed Hydrogen Pressure Swing Adsorption Cycle Sequence | | | | | |
| --- | --- | --- | --- | --- | --- |
| Step No. | Bed A | Bed B | Bed C | Bed D | Valves Open |
| 1 | Feed gas | Eq. Press. | CO fraction | Eq. Press. | 21, 35, 37, |

TABLE 1-continued
Four Bed Hydrogen Pressure Swing Adsorption Cycle Sequence

| Step No. | Bed A | Bed B | Bed C | Bed D | Valves Open |
|---|---|---|---|---|---|
| | Product gas | (repress.) | Production | (depress.) | 41, 47 |
| 2 | Feed gas Product gas | Repressurize Product gas | Product gas Purge | CO fraction Production | 21, 29, 36, 37, 42, 44, 49 |
| 3 | Eq. Press. (depress.) | Feed gas Product gas | Eq. Press. (repress.) | CO fraction Production | 24, 36, 38, 40, 44 |
| 4 | CO fraction Production | Feed gas Product gas | Repressurize Product gas | Product gas Purge | 24, 32, 33, 40, 45, 47, 49 |
| 5 | CO fraction Production | Eq. Press. (depress.) | Feed gas Product gas | Eq. Press. (repress.) | 27, 33, 41, 43, 47 |
| 6 | Product gas Purge | CO fraction Production | Feed gas Product gas | Repressurize Product gas | 23, 27, 34, 38, 43, 48, 49 |
| 7 | Eq. Press. (repress.) | CO fraction Production | Eq. Press. (depress.) | Feed gas Product gas | 30, 34, 38, 44, 46 |
| 8 | Repressurize Product gas | Product gas Purge | CO fraction Production | Feed gas Product gas | 26, 30, 35, 39, 41, 46, 49 |

Feed gas Product gas
Feed gas admitted to bottom of bed. Hydrogen product gas released from top of bed.
Eq. Press. (depress.)
Bed pressure equalized to another bed at lower pressure through top ends of beds.
CO fraction Production
Bed depressurized from intermediate location to withdraw carbon monoxide-rich fraction.
Product gas Purge
Bed purged with product gas through top end of bed to withdraw carbon dioxide-rich fraction.
Eq Press. (repress.)
Bed pressure equalized to another bed at higher pressure through top ends of beds.
Repressurize Product gas
Repressurization of bed to adsorption pressure by backfill with product gas through top of bed.

At the start of the pressure swing adsorption cycle, bed A1/A2 is in the hydrogen production step. Feed mixture from the hydrocarbon steam reformer is passed to the inlet end of bed A1 via feed conduits 1 and 2 (see FIG. 1) and open stop valve 21 at a pressure typically in the range from about 150 psia to about 600 psia. The feed mixture is adsorbed in adsorption bed A1/A2 to selectively sieve hydrogen as a non-adsorbed product and carbon dioxide, carbon monoxide, and methane as adsorbed products. Non-adsorbed hydrogen product gas is withdrawn from the outlet end of bed A2 via open stop valve 37 and passed to hydrogen product reservoir B via hydrogen product pressure control valve PCV1. The hydrogen product gas typically contains less than about 10 vpm impurities.

During the hydrogen production step, the activated carbon adsorbent material in bed A1/A2 adsorbs carbon dioxide and water vapor more strongly than carbon monoxide and methane, which in turn are more strongly adsorbed than hydrogen. As the feed mixture flows through the adsorbent bed, the non-adsorbed mixture becomes enriched in hydrogen. The zeolite molecular sieve adsorbent removes all but traces of other gases and yields a hydrogen product substantially free of impurities. The flow of feed mixture into the inlet end of the first adsorbent bed and flow of product gas from the outlet end of the second adsorbent bed are stopped just before the breakthrough point of non-hydrogen components from the outlet end of the second adsorbent bed. A typical feed and production cycle is conducted for a period of about two to about six minutes.

When the non-hydrogen components in the feed mixture advance close to the outlet end of bed A2, the hydrogen production step in bed A1/A2 is stopped. Stop valves 21 and 37 are closed stopping the production of hydrogen Bed A1/A2 is then depressurized and bed C1/C2 is repressurized by pressure equalization of the beds. Stop valves 38 and 44 are opened and lean gas is passed from the outlet end of bed A2 to the outlet end of bed C2 to substantially equalize the pressure of bed A1/A2 and bed C1/C2. This pressure equalization step typically is conducted for a period of about twenty to about forty seconds.

During the pressure equalization step, the pressure in bed A1/A2 decreases causing carbon monoxide to be desorbed from the adsorbent material in preference to methane, carbon dioxide, and water vapor. Optionally, bed A1/A2 may be pressure equalized with an equalization tank through the outlet end of bed A2. The gas collected in the equalization tank is subsequently used to repressurize a bed in the pressure swing adsorption system.

After the pressure equalization step is complete, bed A1/A2 begins the carbon monoxide production step. Bed A1/A2 is depressurized by an intermediate depressurization step to withdraw and produce a carbon monoxide-rich fraction. Stop valves 38 and 44 are closed and stop valve 33 is opened to withdraw the carbon monoxide-rich fraction from a position intermediate between bed A1 and bed A2. The carbon monoxide-rich fraction is drawn at an intermediate pressure, for example at about 25 psia, and passed to carbon monoxide storage vessel C. The carbon monoxide-rich fraction from carbon monoxide storage vessel C is then passed to carbon monoxide pressure swing adsorption system F via feed conduits 7 and 8 (see FIG. 1).

During the intermediate depressurization step, carbon monoxide, desorbed into the void spaces during the pressure equalization step, is withdrawn. Withdrawal of carbon monoxide during the intermediate depressurization step causes the pressure in the bed to further decrease resulting in additional carbon monoxide desorption. Withdrawal of carbon monoxide from a location intermediate between bed A1 and bed A2 minimizes retention of carbon monoxide (and carbon dioxide) in bed A2 which could contaminate a subsequent hydrogen production step. The time for the carbon monoxide production step is typically about two minutes. The resulting carbon monoxide-rich fraction, which is produced at a pressure between about 25 psia and about 40 psia, generally contains carbon monoxide at least at about a volume fraction of about 2.5 times that in the feed gas, the remainder being mainly hydrogen with up to about 2% of methane and carbon dioxide.

When the intermediate depressurization carbon monoxide production step is complete, bed A1/A2 undergoes carbon dioxide-rich fraction production steps (a depressurization step and a hydrogen product gas purge step). In the first carbon dioxide-rich fraction production step, a carbon dioxide-rich fraction is withdrawn by depressurizing bed A1/A2. During the depressurization step, stop valve 33 is closed and stop valve 23 is opened. The carbon dioxide-rich fraction is withdrawn from the inlet end of Bed A1. The flow of the carbon dioxide-rich fraction is countercurrent to the flow of the feed mixture during the hydrogen production step. In general, the carbon dioxide-rich fraction is produced at a pressure of about 20 psia. The reduction in pressure during the depressurization step and withdrawal of the carbon dioxide-rich fraction causes desorption of carbon dioxide from the adsorbent. Generally, the withdrawal of the carbon dioxide-rich fraction is conducted for a period of one to two minutes. In the second carbon dioxide-rich fraction production step, a carbon dioxide-rich fraction is withdrawn by purging bed A1/A2 with hydrogen product gas. Stop valve 38 is opened. Hydrogen product purge flow control valve FCV2 is opened and bed A1/A2 is purged with hydrogen product gas from bed C1/C2. The flow of hydrogen product purge gas is countercurrent to the flow of the hydrogen gas during the hydrogen production step. Generally, the product gas purge is conducted for a period of about three minutes. The resulting carbon dioxide-rich fraction generally contains at least about 50% by volume carbon dioxide and less than 10% by volume carbon monoxide, traces of methane and water vapor, with the balance being hydrogen. All water vapor in the feed gas is separated into the carbon dioxide-rich fraction.

After the carbon dioxide-rich fraction production steps are complete, bed A1/A2 is repressurized and bed C1/C2 is depressurized by pressure equalization of the beds. Stop valve 23 and hydrogen product purge flow control valve FCV2 are closed and stop valves 44 is opened. Void gas is passed from the outlet end of bed C2 to the outlet end of bed A2 to substantially equalize the pressure of bed A1/A2 and bed C1/C2.

After the pressure equalization step (repressurization step) is complete, bed A1/A2 is backfilled with hydrogen product gas. Stop valves 38 and 44 are closed and bed A1/A2 is repressurized by backfill with product gas. Product gas from producing bed D1/D2 is passed through open repressurization flow control valve FCV1 and into the outlet end of bed A2 to backfill bed A1/A2 through open stop valve 39.

When the backfill step is complete, bed A1/A2 is ready to again begin the hydrogen production step. Repressurization flow control valve FCV1 and stop valve 39 are closed and stop valves 21 and 37 are opened to admit feed mixture from feed conduit 2 to the inlet end of bed A1. The hydrogen production step in bed A1/A2 is begun and the cycle is repeated. Beds A1/A2, B1/B2, C1/C2, and D1/D2 operate in the sequence set out in Table 1. In general, the time to complete a cycle (cycle time) is in the range from about 60 seconds to about 1500 seconds, preferably from about 180 seconds to about 960 seconds, and more preferably from about 240 seconds to about 720 seconds.

Figure 3:
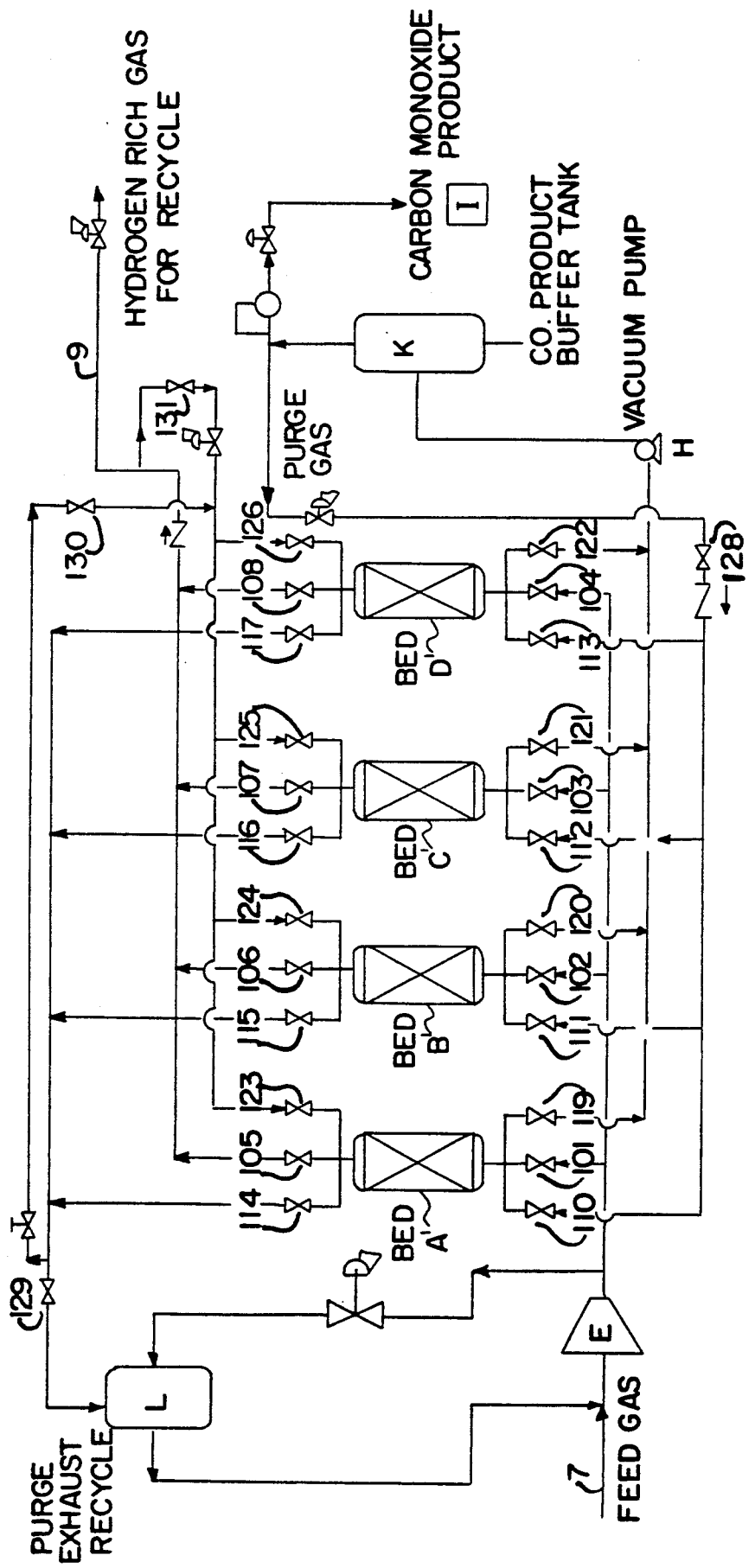
FIG. 3 is a schematic process flow diagram illustrating a second pressure swing adsorption method for separating carbon monoxide as an adsorbed product and hydrogen, carbon dioxide, and methane as a non-adsorbed fraction, according to the present invention.

FIG. 3 illustrates a second (carbon monoxide separation) pressure swing adsorption system for separating carbon monoxide from a feed mixture comprising hydrogen, carbon monoxide, carbon dioxide, and methane according to the present invention. As set out in FIGS. 1 and 2, the feed mixture from hydrogen pressure swing adsorption system A is passed through carbon monoxide storage vessel C and carbon monoxide compressor E to carbon monoxide pressure swing adsorption system F.

In FIG. 3, the carbon monoxide pressure swing adsorption system F comprises adsorption beds A', B', C', and D', carbon monoxide compressor E, carbon monoxide storage vessel K, carbon monoxide product reservoir I, purge gas recycle vessel L, stop valves 101 through 108, valves 110 through 126, and valves 128 through 131, and pressure control valves PCV101, PCV102, PCV103, and flow control valves 101 and 102. Adsorption beds A' through D' are connected in parallel and each adsorption bed contains an inlet (feed, bottom) end and an outlet (discharge, top) end. The adsorbent bed comprises an adsorbent having a greater affinity for carbon monoxide than for hydrogen, carbon dioxide, and methane. For example, the adsorption beds may contain an adsorbent such as copper exchanged aluminosilicate zeolite molecular sieves, copper exchanged alumina, and copper exchanged activated carbon, and mixtures thereof.

The second (carbon monoxide) pressure swing adsorption system is operated in accordance with the full cycle sequence shown in Table 2. The sequence is described below in detail using bed A'. Beds B', C', and D' are employed in the same sequence but at an offset as shown in Table 2. All stop valves may be controlled automatically on a predetermined schedule.

TABLE 2

| Four Bed Carbon Monoxide Pressure Swing Adsorption Cycle Sequence | | | | |
|---|---|---|---|---|
| Step No. | Bed A' | Bed B' | Bed C' | Bed D' | Valves Open |
| 1 | Feed gas Product gas | Eq. Press. (repress.) | CO Production | Eq. Press. (depress.) | 101, 105, 121, 117, 130, 124 |
| 2 | Feed gas Product gas | Repressurize Product gas | CO Production | Cocurrent Product gas Purge | 101, 105, 121, 131, 124, 128, 113, 117, 129 |
| 3 | Eq. Press. (depress.) | Feed gas Product gas | Eq. Press. (repress.) | CO Production | 102, 106, 122, 114, 130, 125 |
| 4 | Cocurrent Product gas Purge | Feed gas Product gas | Repressurize Product gas | CO Production | 102, 106, 122, 128, 110, 114, 129, 131, 125 |
| 5 | CO Production | Eq. Press. (depress.) | Feed gas Product gas | Eq. Press. (repress.) | 103, 107, 119, 115, 130, 126 |
| 6 | CO Production | Cocurrent Product gas Purge | Feed gas Product gas | Repressurize Product gas | 103, 107, 119, 128, 111, 115, 129, 131, 126 |

TABLE 2-continued

Four Bed Carbon Monoxide Pressure Swing Adsorption Cycle Sequence

| Step No. | Bed A' | Bed B' | Bed C' | Bed D' | Valves Open |
|---|---|---|---|---|---|
| 7 | Eq. Press. (repress.) | CO Production | Eq. Press. (depress.) | Feed gas Product gas | 104, 108, 120, 116, 130, 123 |
| 8 | Repressurize Product gas | CO Production | Cocurrent Product gas Purge | Feed gas Product gas | 104, 108, 120, 131, 123, 128, 112, 116, 129 |

Feed gas Product gas
Feed gas admitted to bottom of bed. Product gas released from top of bed.
Eq. Press. (depress.)
Bed pressure equalized to another bed at lower pressure through top ends of beds.
Cocurrent Product gas Purge
Bed purged with product gas in cocurrent direction.
CO Production
Bed opened to vacuum pump through bottom end of bed to produce carbon monoxide.
Eq. Press. (repress.)
Bed pressure equalized to another bed at higher pressure through top ends of beds.
Repressurize Product gas
Repressurization of bed to adsorption pressure by backfill with product gas through top of bed.

At the start of the pressure swing adsorption cycle, bed A' is in the carbon monoxide adsorption step. Carbon monoxide-rich feed mixture from carbon monoxide compressor E is passed to the inlet end of bed A' via open stop valve 101 at a pressure typically in the range from about 25 psia to about 600 psia. The feed mixture is adsorbed in adsorption bed A' to selectively sieve carbon monoxide as an adsorbed fraction. Nonadsorbed carbon dioxide, hydrogen, methane, and any carbon monoxide are withdrawn from the outlet end of bed A' via open stop valve 105 and passed to feed conduit 9 for recycle to hydrogen pressure swing adsorption system A (see FIGS. 1 and 2).

During the carbon monoxide adsorption step, the adsorbent bed of copper aluminosilicate zeolite molecular sieves adsorbs carbon monoxide more strongly than carbon dioxide, hydrogen, and methane. As the feed mixture flows through the adsorbent bed, the bed becomes enriched in carbon monoxide. The flow of carbon monoxide-rich feed mixture into adsorbent bed A, is stopped just before the breakthrough point of carbon monoxide from the outlet end of adsorbent bed A'. A typical feed and carbon monoxide adsorption cycle is conducted for a period of about two to about six minutes.

When carbon monoxide in the feed mixture advances close to the outlet end of bed A', the carbon monoxide adsorption step in bed A' is stopped. Stop valves 101 and 105 are closed stopping the carbon monoxide adsorption step. Bed A' is then depressurized and bed C' is repressurized by pressure equalization of the beds. Stop valves 114, 130, and 125 are opened and lean gas is passed from the outlet end of bed A' to the outlet end of bed C' to substantially equalize the pressure of bed A' and bed C'. This pressure equalization step typically is conducted for a period of about twenty to about forty seconds. Optionally, bed A' may be pressure equalized with an equalization tank through the outlet end of the adsorption bed. The gas collected in the equalization tank is subsequently used to repressurize a bed in the pressure swing adsorption system. If the adsorption pressure is very low (for example, under 25 psia or lower), the pressure equalization step is not employed or a partial pressure equalization step is employed.

After the pressure equalization step, a carbon monoxide product cocurrent purge step is employed to displace the impurities [carbon monoxide, hydrogen, and methane] in the void gas left in the bed after the o adsorption and pressure equalization steps. Bed A' is purged from the inlet end with carbon monoxide product gas from carbon monoxide product gas reservoir I. Stop valve 130 is closed and stop valves 110, 128, and 139 and product purge flow control valve FCV102 are opened. Product purge gas effluent is then passed to purge gas recycle vessel L. The flow of carbon monoxide product purge gas is cocurrent to the flow of the carbon monoxide gas during the carbon monoxide adsorption step. The product purge gas from purge gas recycle vessel L is then recycled to the carbon monoxide pressure swing adsorption system via carbon monoxide compressor E. Generally, the purge with product gas is conducted for a period of about three minutes.

After the cocurrent carbon monoxide purge step, bed A' undergoes a carbon monoxide production step. Stop valves 128, 110, 114, and 129 are closed and stop valve 119 is opened. The adsorbed carbon monoxide is removed from the inlet end of bed A' by applying a vacuum using vacuum pump H and open stop valve 119. The resulting carbon monoxide-rich fraction generally contains at least about 98% by volume carbon monoxide with the balance being traces of hydrogen, carbon dioxide, and methane. In general, the desorption pressure is from about 75 torr to about 300 torr, preferably from about 100 torr to about 150 torr.

After the carbon monoxide production step (vacuum regeneration step) is complete, bed A' is repressurized and bed C' is depressurized by pressure equalization of the beds. Stop valves 130 and 123 are opened and void gas is passed from the outlet end of bed C' to the outlet end of bed A' to substantially equalize the pressure of bed A' and bed C'.

After the repressurization step, bed A' is backfilled with hydrogen-rich product gas. Stop valves 130 is closed and stop valves 131 is opened. Product gas from producing bed D' is passed through repressurization flow control valve FCV101 into the 5 outlet end of bed A' to backfill and repressurize bed A'.

When the backfill step is complete, bed A' is ready to again begin the carbon monoxide adsorption step. Repressurization flow control valve FCV101 and stop valves 131 and 123 are closed and stop valves 101 and 105 are opened to admit carbon monoxide-rich feed mixture from compressor E to the inlet end of bed A'. The carbon monoxide adsorption step in bed A' is begun and the cycle is repeated. Beds A', B', C', and D' operate in the sequence set out in Table 2. In general, the time to complete a cycle (cycle time) is in the range from about 60 seconds to about 1500 seconds, preferably from about 240 seconds to about 960 seconds, and more preferably from about 240 seconds to about 720 seconds.

In a preferred embodiment, the present invention is directed at a method for producing hydrogen and carbon monoxide from a feed mixture comprising hydrogen, carbon monoxide, carbon dioxide, and methane, which comprises the steps of:

(a) passing the feed mixture through a first pressure swing adsorption system containing an adsorption bed comprising an adsorbent having a greater affinity for carbon dioxide, methane, and carbon monoxide than for hydrogen to separate hydrogen as a pure non-adsorbed product and carbon dioxide, methane, and carbon monoxide as an adsorbed fraction;

(b) desorbing carbon monoxide from the pressure swing adsorption system in step (a) to form a carbon monoxide-rich fraction;

(c) desorbing carbon dioxide and methane from the pressure swing adsorption system in step (a) to form a carbon dioxide-rich fraction;

(d) passing the carbon monoxide-rich fraction from step (b) to a second pressure swing adsorption system containing an adsorption bed comprising an adsorbent having a greater affinity for carbon monoxide than for hydrogen, carbon dioxide, and methane to separate carbon monoxide as an adsorbed fraction and hydrogen, carbon dioxide, and methane as a non-adsorbed fraction; and (e) desorbing carbon monoxide from the pressure swing adsorption system in step (d) to form a pure carbon monoxide product.

Figure 4:
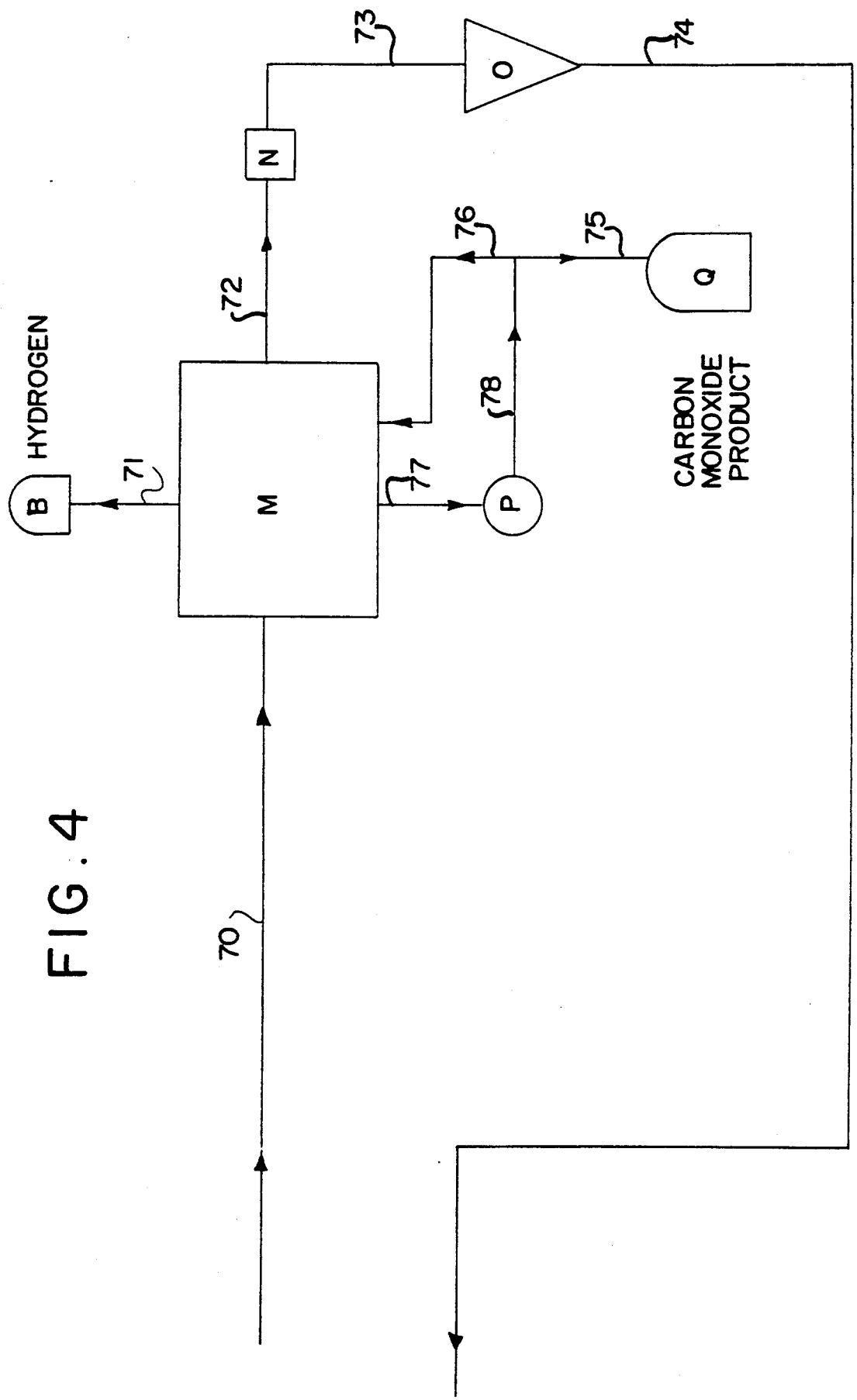
FIG. 4 is a schematic process flow diagram illustrating a novel two stage pressure swing adsorption system according to the present invention to separate hydrogen and carbon monoxide from a feed mixture comprising hydrogen, carbon monoxide, carbon dioxide, and methane.

FIG. 4 illustrates a second embodiment of the present invention for producing hydrogen and carbon monoxide from a feed mixture comprising hydrogen, carbon monoxide, carbon dioxide, and methane by using a two stage (first stage/second stage, top stage/bottom stage) pressure swing adsorption system. In this embodiment, hydrogen is the unadsorbed gas, carbon dioxide and methane are the first desorbed gases, and carbon monoxide is the strongly adsorbed gas. In FIG. 4, gaseous feed mixture is fed through feed conduit 70 to two stage pressure swing adsorption system M to separate the mixture. Typically the feed mixture from the hydrocarbon steam reformer will enter two stage pressure swing adsorption system M at a pressure in the range from about 150 psia to about 600 psia, preferably from about 150 psia to about 400 psia, and more preferably from about 150 psia to about 300 psia. After being cooled, the feed mixture entering pressure swing adsorption system M will be at ambient temperature.

During the hydrogen product production step, feed mixture is fed into and hydrogen product is withdrawn from two stage pressure swing adsorption system M. Hydrogen product is separated as a pure non-adsorbed product and carbon monoxide, carbon dioxide, methane, and water vapor is separated as an adsorbed fraction. Hydrogen product (merchant grade, less than about 10 vpm impurities) is withdrawn from two stage pressure swing adsorption system M through feed conduit 71 and passed to hydrogen reservoir B.

After the hydrogen product production step, pressure swing adsorption system M undergoes a pressure equalization step, an intermediate depressurization step, and a second stage purge/first stage purge step (carbon dioxide-rich fraction production steps). During the intermediate depressurization step, carbon dioxide-rich gas is collected as secondary product, compressed, and recycled to the reformer feed gas. During the second stage purge/first stage purge step, the second stage is purged with hydrogen from another stage and the first stage is purged through conduit 76 with carbon monoxide product gas from the receiver. The depressurization and purge effluent gases are passed to carbon dioxide reservoir N and collected as secondary product via feed conduit 72. The gases are then passed to compressor O via feed conduit 73 and compressed and recycled to the reformer feed gas via feed conduit 74. In general, carbon dioxide compressor O will compress the carbon dioxide-rich fraction to a pressure in the range from about 150 psia to about 600 psia, preferably from about 150 psia to about 450 psia, and more preferably from about 150 psia to about 350 psia.

After the carbon dioxide-rich fraction production steps, pressure swing adsorption system M undergoes a second stage purge/first stage evacuation step (carbon monoxide production step). In the second stage purge/first stage evacuation step, the second stage is purged with hydrogen gas and the first stage is evacuated using vacuum pump P to remove carbon monoxide product gas. The carbon monoxide product gas is withdrawn through feed conduits 77 and 78 and passed to carbon monoxide reservoir Q.

After the carbon monoxide production step, pressure swing adsorption system M undergoes a pressure equalization step (repressurization). During the pressure equalization step, the bed is repressurized by pressure equalization with another bed. The bed is then repressurized to adsorption pressure using hydrogen gas from the pressure swing adsorption system. The carbon monoxide product (merchant grade, less than about 1500 vpm impurities) is passed through feed conduits 77, 78, and 75 to carbon monoxide reservoir Q.

Figure 5:
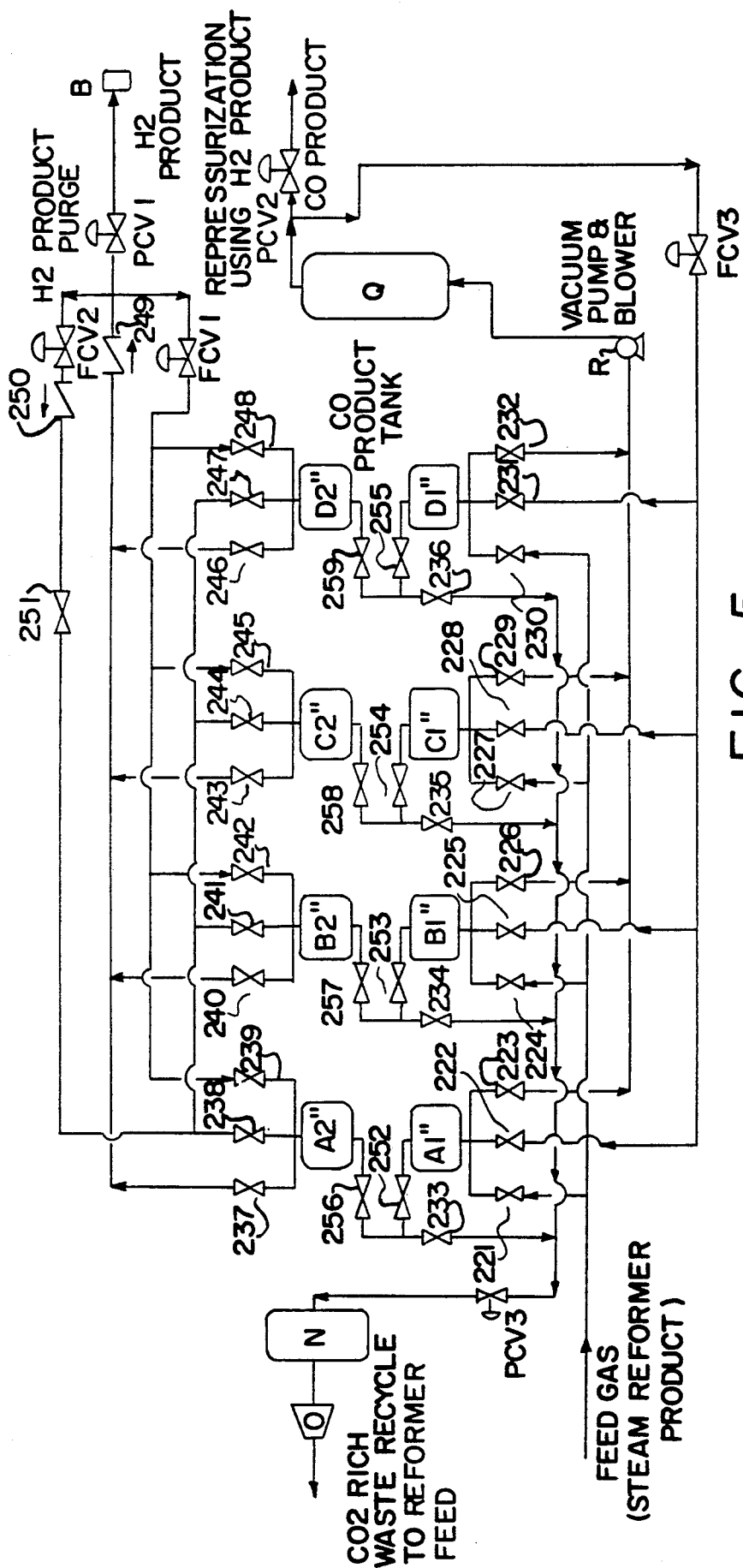
FIG. 5 is a schematic process flow diagram illustrating a first stage of a pressure swing adsorption system for separating carbon monoxide as an adsorbed product and a second stage of a pressure swing adsorption system for separating carbon dioxide as an adsorbed fraction and hydrogen as a non-adsorbed product, according to the present invention.

FIG. 5 illustrates a two stage pressure swing adsorption method for separating carbon monoxide and hydrogen from a feed mixture comprising hydrogen, carbon monoxide, carbon dioxide, and methane in accord with the second embodiment of the present invention. As set out in FIG. 4, the feed mixture from the hydrocarbon steam reformer is passed through feed conduit 70 to pressure swing adsorption system M.

In FIG. 5, the two stage pressure swing adsorption system M comprises adsorption beds A", B", C" and D" carbon monoxide storage vessel Q, carbon dioxide-rich gas buffer vessel N, hydrogen product reservoir B, hydrogen product pressure control valve PCV1, carbon monoxide-rich product gas pressure control valve PCV2, carbon dioxide product pressure control valve PCV3, repressurization flow control valve FCV1, hydrogen product purge gas flow control valve FCV2, stop valves 221 through 259, and non-return valves 249 and 250.

Adsorption beds A" through D" are connected in parallel. Each of the adsorption beds, A", through D", is physically divided into two stages, a first (bottom) stage and a second (top) stage, A1"/A2", B1"/B2", C1"/C2" and D1"/D2" respectively, which are connected in series. Each stage contains an inlet (feed) end and a outlet (discharge) end. The first stage and second stage of each bed are isolated by two stop valves for sequential depressurization and carbon monoxide production steps (i.e., first stage A1", and second stage A2" are isolated by stop valves 252 and 256). The two part stages facilitate removal of a carbon dioxide stream from an intermediate position in the bed. The carbon dioxide stream is drawn at an intermediate pressure, for example at about 25 psia, and passed to carbon dioxide storage vessel N. The first adsorption bed stage (for example, first stage A1",) comprises an adsorbent having a greater affinity for carbon monoxide than for hydrogen, carbon dioxide, and methane and may be selected from the group consisting of copper exchanged Y-type aluminosilicate zeolite molecular sieves, copper exchanged alumina, and copper exchanged activated carbon. The second adsorption bed stage (for example, second stage A2",) comprises an adsorbent having a greater affinity for carbon dioxide, methane, and carbon monoxide than for hydrogen and may be a molecular sieve or activated carbon, and preferably is a combination of molecular sieves and activated carbon.

The two stage pressure swing adsorption system is operated in accordance with the full cycle sequence shown in Table 3. The sequence is described below in detail using stages A1"/A2". Stages B1"/B2", C1"/C2", and D1"/D2" are employed in the same sequence but at an offset as shown in Table 3. All stop valves may be controlled automatically on a predetermined schedule.

ide, carbon monoxide, and methane as adsorbed products. Non-adsorbed hydrogen product gas is withdrawn from the outlet end of second stage A2" via open stop valve 237 and passed to hydrogen product reservoir B via non-return valve 249 and hydrogen product pressure control valve PCV1. The hydrogen product gas typically contains less than about 10 vpm impurities.

During the hydrogen production step, the copper exchanged substrate in first stage A1", preferentially adsorbs carbon monoxide. The activated carbon/molecular sieve adsorbent material in second stage A2" preferentially adsorbs carbon dioxide, water vapor, and methane more strongly than hydrogen. As the feed mixture flows through the adsorbent stages, carbon monoxide becomes concentrated in first stage A1", carbon dioxide, water vapor, and methane become concentrated in second stage A2", and the mixture exiting the bed stages becomes enriched in hydrogen. The zeolite molecular sieve adsorbent removes all but traces of other gases and yields a hydrogen product substantially free of impurities. The flow of feed mixture into the inlet end of the first stage and flow of product gas from

TABLE 3

Four Bed Two Stage Pressure Swing Adsorption Cycle Sequence

| Step No. | Bed A" | Bed B" | Bed C" | Bed D" | Valves Open |
|---|---|---|---|---|---|
| 1 | Feed gas Product gas | Eq. Press. (repress.) | Top Purge Bottom Purge | Eq. Press. (depress.) | 221, 237, 252, 256, 238, 253, 257, 255, 259, 244, 258, 254, 235, 228 |
| 2 | Feed gas Product gas | Repressurize $H_2$ Product gas | Top Purge CO Production | Top/Bottom Depressurize | 221, 237, 252, 256, 242, 257, 253, 251, 244, 258, 235, 229, 255, 259, 236 |
| 3 | Eq. Press. (depress.) | Feed gas Product gas | Eq. Press. (repress.) | Top Purge Bottom Purge | 224, 240, 253, 257, 252, 256, 238, 244, 258, 254, 259, 236, 231, 255 |
| 4 | Top/Bottom Depressurize | Feed gas Product gas | Repressurize $H_2$ Product gas | Top Purge CO Production | 224, 240, 253, 257, 256, 252, 233, 245, 258, 254, 251, 247, 259, 236, 232 |
| 5 | Top Purge Bottom Purge | Eq. Press. (depress.) | Feed gas Product gas | Eq. Press. (repress.) | 227, 243, 254, 258, 256, 233, 222, 252, 253, 257, 241, 247, 259, 255 |
| 6 | Top Purge CO Production | Top/Bottom Depressurize | Feed gas Product gas | Repressurize $H_2$ Product gas | 227, 243, 254, 258, 251, 238, 256, 233, 223, 257, 253, 234, 248, 259, 255 |
| 7 | Eq. Press. (repress.) | Top Purge Bottom Purge | Eq. Press. (depress.) | Feed gas Product gas | 230, 246, 255, 259, 252, 256, 238, 244, 258, 254, 257, 234, 225, 253 |
| 8 | Repressurize $H_2$ Product gas | Top Purge CO Production | Top/Bottom Depressurize | Feed gas Product gas | 230, 246, 255, 259, 239, 256, 252, 251, 241, 257, 234, 226, 258, 254, 235 |

Feed gas/Product gas
Feed gas admitted to bottom of bed. Product gas released from top of bed.
Eq. Press. (depress.)
Bed pressure equalized to another bed at lower pressure through top ends of beds.
Top/Bottom Depressurize
Top and bottom beds depressurized from intermediate location. Depressurized gas recycled to reformer feed gas.
Top Purge/Bottom Purge
Top bed purged with hydrogen. Bottom bed purged with carbon monoxide. Purge effluent removed from intermediate location.
Top Purge/CO Production
Top bed purged with hydrogen. Bottom bed evacuated to remove carbon monoxide product gas.
Eq. Press. (repress.)
Bed pressure equalized with another bed at higher pressure through top ends of beds.
Repressurize $H_2$ Product gas
Repressurization of bed to adsorption pressure using hydrogen product gas from pressure swing adsorption system.

At the start of the pressure swing adsorption cycle, first stage A1" and second stage A2" are in the hydrogen production step. Feed mixture from the hydrocarbon steam reformer is passed to the inlet end of first stage A1" via open stop valve 221 at a pressure typically in the range from about 150 psia to about 600 psia. The feed mixture passes from the outlet end of the first stage A1" through stop valves 252 and 256 to the inlet end of the second stage A2". The feed mixture is adsorbed in first stage A1" and second stage A2" to selectively sieve hydrogen as an non-adsorbed fraction and carbon dioxthe outlet end of the second stage are stopped just before the breakthrough point of non-hydrogen components from the outlet end of the second stage. A typical feed and production cycle is conducted for a period of about two to about six minutes.

When the non-hydrogen components (i.e., methane) in the feed mixture advance close to the outlet end of second stage A2", the hydrogen production step in first stage A1"/A2" is stopped. Stop valves 221 and 237 are closed stopping the production of hydrogen. First stage A1″ and second stage A2″ are then depressurized (treated as one bed with stop valves 252 and 256 open) and stage C1″/C2″ is repressurized (treated as one bed with stop valves 254 and 258 open) by pressure equalization of the beds through the outlet (top, discharge) ends of the beds. Stop valves 238 and 244 are opened and void gas is passed from the outlet end (top) of second stage A2″ to the outlet end (top) of bed C2″ to substantially equalize the pressures in beds A1″/A2″ and beds C1″/C2″. This pressure equalization step typically is conducted for a period of about twenty to about forty seconds.

During the pressure equalization step, void gas containing carbon dioxide and methane is passed to the repressurized bed and the pressure in first stage A1″/A2″ decreases. Optionally, first stage A1″/A2″ may be pressure equalized with an equalization tank through the outlet end of second stage A2″. The gas collected in the equalization tank is subsequently used to repressurize a bed in the pressure swing adsorption system.

After the pressure equalization step is complete, first stage A1″/A2″ begins the intermediate depressurization step (a first carbon dioxide-rich fraction production step). During the intermediate depressurization step, first stage A1″ and second stage A2″ are depressurized from an intermediate location to withdraw and produce a carbon dioxide-rich fraction. Stop valves 238 and 244 are closed and stop valves 233, 252, and 256 are opened to withdraw the carbon dioxide-rich fraction from a position intermediate between first stage A1″ and second stage A2″. The carbon dioxide-rich fraction is drawn at an intermediate pressure, for example at about 25 psia, and passed to carbon dioxide storage vessel N. The carbon dioxide-rich fraction from carbon dioxide storage vessel N is then passed to the reformer feed gas via compressor 0.

During the intermediate depressurization step, void gas in second stage A2″, which is predominantly carbon dioxide, is withdrawn from the inlet (bottom) end of the bed. Withdrawal of carbon dioxide-rich void gas from the outlet (top) end of first stage A1″, causes the carbon monoxide, adsorbed near the bottom of the bed, to be desorbed displacing additional void gas. Withdrawal of carbon dioxide from a location intermediate between first stage A1″ and second stage A2″ minimizes retention of carbon dioxide in the top region of second stage A2″ which could contaminate a subsequent carbon monoxide production step. The time for the intermediate depressurization step is typically about two minutes.

When the intermediate depressurization carbon monoxide production step is complete, first stage A1″/A2″ undergoes a second stage purge/first stage purge step (a second carbon dioxide-rich fraction production step). During the second stage purge/first stage purge step, second stage A2″ is purged with hydrogen gas and first stage A1″ is purged with carbon monoxide product gas from carbon monoxide reservoir Q. During the purge of second stage A2″ with hydrogen gas, stop valves 251, 138, and 233 are opened. Hydrogen from hydrogen reservoir B is then passed through open flow control valve FCV2, open non-return valve 250, and open stop valves 251 and 238, through second stage A2″, and open stop valves 256 and 233 to carbon dioxide reservoir N. During the purge of first stage A1″ with carbon monoxide gas, stop valves 222, 252, 230 are opened. Carbon monoxide from carbon monoxide reservoir Q is then passed through open flow control valve FCV3, open stop valve 222, through first stage A1″, and open stop valves 252 and 233 to carbon dioxide reservoir N. The flow of hydrogen through second stage A2″ is in a direction countercurrent and the flow of carbon monoxide is in a direction cocurrent to the flow of the feed mixture during the hydrogen production step. Generally, the purge steps are carried out simultaneously and are conducted for a period of one to two minutes The resulting carbon dioxide-rich fraction generally contains at least about 50% by volume carbon dioxide and less than 10% by volume carbon monoxide, and small amounts of methane, with the balance being hydrogen.

When the second stage purge/first stage purge step is complete, stages A1″ and A2″ undergo a second stage purge/first stage evacuation step (carbon monoxide production step). During the second stage purge/first stage evacuation step, second stage A2″ is purged with hydrogen gas and first stage A1″ is evacuated using vacuum pump R to withdraw carbon monoxide product gas from the inlet end of first stage A1″, for passage to carbon monoxide reservoir Q. During the production of carbon monoxide, stop valves 252 and 222 are closed. Carbon monoxide is then passed from first stage A1″ through open stop valve 223 to carbon monoxide reservoir Q. Generally, the purge and production steps are carried out simultaneously and are conducted for a period of one to two minutes.

The resulting carbon monoxide-rich fraction, which is produced at a pressure at about 25 psia, generally contains carbon monoxide having a purity exceeding 98%.

After the carbon monoxide production step is complete, first stage A1″, and second stage A2″ is repressurized and bed C1″/C2″ is depressurized by pressure equalization of the beds. Stop valves 223, 233, and 251 are closed and stop valve 244 is opened. Void gas is passed from the outlet end of second stage C2″ to the outlet end of second stage A2″ to substantially equalize the pressure of bed A1″/A2″ and bed C1″/C2″, After the pressure equalization step (repressurization step) is complete, first stage A1″ and second stage A2″ are backfilled with hydrogen product gas. Stop valves 238 and 244 are closed and bed A1″/A2″ is repressurized by backfill with product gas. Product gas from producing bed D1″/D2″ is passed through open repressurization flow control valve FCV1 and into the outlet end of second stage A2″ to backfill bed A1″/A2″ through open stop valve 239.

When the backfill step is complete, first stage A1″ and second stage A2″ are ready to again begin the hydrogen production step. Repressurization flow control valve FCV1 and stop valve 239 are closed and stop valves 221 and 237 are opened to admit feed mixture to the inlet end of first stage A1″. The hydrogen production step in bed A1″/A2″ is begun and the cycle is repeated. Beds A1″/A2″, B1″/B2″, C1″/C2″ and D1″/D2″ operate in the sequence set out in Table 3. In general, the time to complete a cycle (cycle time) is in the range from about 60 seconds to about 1500 seconds, preferably from about 180 seconds to about 960 seconds, and more preferably from about 240 seconds to about 720 seconds.

In a preferred embodiment, the present invention is directed at a method for producing hydrogen and carbon monoxide from a feed mixture comprising hydrogen, carbon monoxide, carbon dioxide, and methane, which comprises the steps of:

(a) providing a pressure swing adsorption system having a first stage and a second stage, wherein the first stage contains an adsorption bed comprising an adsorbent having a greater affinity for carbon monoxide than for hydrogen, carbon dioxide, and methane, the second stage contains an adsorption bed comprising an adsorbent having a greater affinity for carbon dioxide, methane, and carbon monoxide than for hydrogen, and the first and second stages are connected in series and each stage contains an inlet end and an outlet end;

(b) passing the feed mixture through the first stage of the pressure swing adsorption system to separate carbon monoxide as an adsorbed fraction and hydrogen, carbon dioxide, and methane as a non-adsorbed fraction;

(c) passing the non-adsorbed fraction from step (b) through the second stage of the pressure swing adsorption system to separate carbon dioxide and methane as an adsorbed fraction and hydrogen as a non-adsorbed pure product;

(d) desorbing carbon dioxide and methane from the first and second stages of the pressure swing adsorption system to form a carbon dioxide-rich fraction; and (e) desorbing carbon monoxide from the first stage of the pressure swing adsorption system to form a pure carbon monoxide product.

The selectivity of the adsorbent material in the bed of the pressure swing adsorption system for a gaseous component is generally governed by the volume of the pore size and the distribution of that pore size in the adsorbent. Gaseous molecules with a kinetic diameter less than, or equal to, the pore size of the adsorbent are adsorbed and retained in the adsorbent while gaseous molecules with a diameter larger than the pore size of the adsorbent pass through the adsorbent. The adsorbent thus sieves the gaseous molecules according to their molecular size. The adsorbent may also separate molecules according to their different rates of diffusion in the pores of the adsorbent.

Zeolite molecular adsorbents adsorb gaseous molecules with some dependence upon crystalline size. In general, adsorption into zeolite is fast and equilibrium is reached typically in a few seconds. The sieving action of zeolite is generally dependent upon the difference in the equilibrium adsorption of the different components of the gaseous mixture. When air is separated by a zeolite adsorbent, nitrogen is preferentially adsorbed over oxygen and the pressure swing adsorption method may be employed to produce an oxygen enriched product. When hydrogen, carbon monoxide, carbon dioxide, and methane are separated by a zeolite adsorbent, carbon dioxide, carbon monoxide, and methane are the adsorbed components, in the order indicated, and hydrogen is the unadsorbed component.

During the carbon monoxide pressure swing adsorption separation, carbon dioxide, hydrogen, and methane are removed from the feed mixture as vent gas during the pressure equalization step. A certain amount of carbon monoxide is lost with the vent gas. This loss of carbon monoxide results from carbon monoxide not adsorbed in the sieves at the pressure swing adsorption operation pressure, and carbon monoxide present in the bed voids and discharged during the pressure equalization step. This vent gas containing carbon monoxide is recycled to the pressure swing adsorption system as feed gas during the carbon monoxide cocurrent purge step.

Although a particular carbon monoxide pressure swing adsorption cycle sequence was illustrated as a preferred embodiment (Table 1 and Table 2), other variations of pressure swing adsorption process cycle sequences may be employed. A simple pressure swing adsorption process cycle sequence may consist of the following steps: (i) adsorption wherein feed mixture enters the inlet end of the adsorbent bed and the product gas exits the outlet end of the adsorbent bed, (ii) bed pressure equalization through the outlet and inlet ends of the bed to depressurize the bed, (iii) countercurrent vent, (iv) vacuum regeneration to remove components strongly adsorbed in the bed, (v) bed pressure equalization to partially repressurize the regenerated bed, and (vi) repressurization using a product backfill.

The process cycle sequence illustrated in Table 1 can increase the carbon monoxide yield to approximately 70%. The carbon monoxide product withdrawal step incorporated in the process sequence referred to in Table 1 reduces carbon monoxide loss by permitting the withdrawal of substantial amounts of carbon monoxide containing bed void gas and gas weakly bound to the adsorbent. The selection of an intermediate location for withdrawing the carbon monoxide-rich fraction increases the amount of carbon monoxide withdrawn without affecting the hydrogen product purity. If the carbon monoxide-rich fraction is withdrawn from the outlet end of the adsorption bed, then the quantity of the product withdrawn, without affecting hydrogen product purity, will be limited and the net carbon monoxide recovery that can be achieved will only be between about 30% and about 50%. When the carbon monoxide-rich fraction is withdrawn from an intermediate position in the bed, the beds need not be separate vessels (first stage A1" and second stage A2", for example) but may be two regions inside a single vessel between which a side port is located for withdrawing the carbon monoxide product.

The carbon monoxide yield may be improved to 85% or greater by including a cocurrent purge during the carbon monoxide production step in the carbon monoxide pressure swing adsorption system. In this variation of the cycle, a portion of the carbon dioxide-rich fraction is compressed and fed as cocurrent purge gas to the inlet end of the adsorption bed (inlet end of bed A", for example) during the carbon monoxide production step. The cocurrent purge, also referred as sweep or displacement gas, displaces the carbon monoxide near the inlet end of the adsorption bed (inlet end of bed A", for example) further along and permits removal of more carbon monoxide.

In yet another process cycle variation, the carbon monoxide production step in the hydrogen pressure swing adsorption system is split into two parts. In the first part, the outlet end (second stage A2", for example) is opened to the carbon monoxide product line while cocurrent purge gas (carbon dioxide-rich fraction) is admitted to the lower region (first stage A1", for example). In the second part, the outlet region is isolated and the inlet region is opened to the carbon monoxide product line. To conduct this process cycle variation, two additional stop valves must be provided to isolate the two regions from each other and from the carbon monoxide product line.

In a preferred embodiment, the carbon monoxide depressurization product from the pressure swing adsorption system is withdrawn from the outlet end of the bed in the pressure swing adsorption system. In another preferred embodiment, the carbon monoxide depressurization product from the pressure swing adsorption system is withdrawn from an intermediate location in the bed in the pressure swing adsorption system.

The carbon monoxide product withdrawal location is preferably as close as possible to the outlet end of the adsorption bed. The volume of second stage A2", for example, must be as small as possible compared to the volume of first stage A1", The volume of second stage A2" must, however, be large enough so that the hydrogen enriched product purity is not affected as a result of carbon monoxide product production. During the production cycle, concentration fronts are formed for each of the components in the feed. Components that are strongly adsorbed (e.g. carbon dioxide) exist at feed concentration in the gas phase near the entrance of the bed. Over a length equal to the equilibrium saturation zone, the gas phase concentration is constant. Beyond this length the concentration of the adsorbed component decreases sharply. In the present separation (hydrogen, carbon monoxide, carbon dioxide, and methane from the feed mixture), the production of hydrogen-rich primary product must be stopped when the equilibrium front is well within the pressure swing adsorption bed. The outlet end of a pressure swing adsorption bed at the completion of the production step thus contains predominant amounts of hydrogen which mainly accounts for the hydrogen losses with the vent. It is desirable to collect a carbon monoxide product in a direction cocurrent to feed by moderate pressure reduction of the pressure swing adsorption beds before carbon monoxide product vent is initiated. The carbon monoxide product contains a significant amount of hydrogen.

When a small quantity of carbon monoxide product, for example 5-10% of feed, is collected, it is preferable to withdraw the carbon monoxide product stream from the outlet of the bed. If greater than 10% of the feed is collected, the carbon monoxide product stream should be withdrawn from an intermediate location on the bed. This method prevents contamination of the high pressure hydrogen-rich product.

The pressure swing adsorption unit must be regenerated periodically. Suitable modes of regeneration include (i) regeneration at or below 25 psia coupled with product purge or purge from an external source, and (ii) vacuum regeneration.

Throughout this application, various publications have been referenced. The disclosures in these publications are incorporated herein by reference in order to more fully describe the state of the art.

The embodiments described herein are merely exemplary and a person skilled in the art may make many variations and modifications without departing from the spirit and scope of the invention. All such modifications and variations are intended to be included within the scope of the invention as defined in the appended claims.

We claim:

1. A method for producing hydrogen and carbon monoxide from a feed mixture comprising hydrogen, carbon monoxide, carbon dioxide, and methane, which comprises the steps of:
   (a) passing the feed mixture through a first pressure swing adsorption system containing an adsorption bed comprising an adsorbent having a greater affinity for carbon dioxide, methane, and carbon monoxide than for hydrogen to separate hydrogen as a pure non-adsorbed product and carbon dioxide, methane, and carbon monoxide as an adsorbed fraction;
   (b) desorbing carbon monoxide from the pressure swing adsorption system in step (a) to form a carbon monoxide-rich fraction;
   (c) desorbing carbon dioxide and methane from the pressure swing adsorption system in step (a) to form a carbon dioxide-rich fraction;
   (d) passing the carbon monoxide-rich fraction from step (b) to a second pressure swing adsorption system containing an adsorption bed comprising an adsorbent having a greater affinity for carbon monoxide than for hydrogen, carbon dioxide, and methane to separate carbon monoxide as an adsorbed fraction and hydrogen, carbon dioxide, and methane as a non-adsorbed fraction; and
   (e) desorbing carbon monoxide from the pressure swing adsorption system in step (d) to form a pure carbon monoxide product.

2. The method according to claim 1, wherein the feed mixture comprises hydrogen in an amount up to about 80%, carbon monoxide in an amount up to about 20%, carbon dioxide in an amount up to about 30%, and methane in an amount up to about 3%.

3. The method according to claim 1, wherein the adsorbent in the adsorption bed in step (a) comprises activated carbon and zeolite molecular sieves.

4. The method according to claim 3, wherein the zeolite molecular sieves are an aluminosilicate zeolite selected from the group consisting of type 5A, 10X, 13X zeolite molecular sieves, and mordenites.

5. The method according to claim 1, wherein the adsorption bed in step (a) is divided into a first adsorption bed and a second adsorption bed, wherein the first and second beds are connected in series and each adsorption bed contains an inlet end and an outlet end.

6. The method according to claim 5, further comprising the steps of passing the feed mixture in step (a) through the inlet end of the first adsorption bed, withdrawing the hydrogen product from the outlet end of the second adsorption bed, stopping the flow of feed mixture into the inlet end of the first adsorption bed, withdrawing the desorbed carbon monoxide-rich fraction in step (b) from a location intermediate between the first and second adsorption beds, and withdrawing the desorbed carbon dioxide-rich fraction in step (c) from the inlet end of the first adsorption bed.

7. The method according to claim 6, wherein the carbon monoxide-rich fraction in step (b) is first withdrawn from the inlet end of the second adsorption bed, then withdrawn from the outlet end of the first adsorption bed, and while the carbon monoxide-rich fraction is withdrawn from the inlet end of the second adsorption bed, a portion of the carbon dioxide-rich fraction in step (c) is introduced into the inlet end of the first adsorption bed.

8. The method according to claim 1, wherein the carbon dioxide-rich fraction in step (c) is desorbed by a depressurization step and a hydrogen gas purge step.

9. The method according to claim 1, wherein the desorbed carbon dioxide-rich fraction in step (c) is recycled to a hydrocarbon steam reformer.

10. The method according to claim 1, wherein the adsorbent in the adsorption bed in step (d) is selected from the group consisting of copper exchanged Y-type aluminosilicate zeolite molecular sieves, copper exchanged alumina, and copper exchanged activated carbon, and mixtures thereof.

11. The method according to claim 10, wherein the adsorbent is copper exchanged Y-type aluminosilicate zeolite molecular sieves.

12. The method according to claim 1, wherein the pressure swing adsorption system in step (d) is operated at an adsorption pressure in the range from about 150 psia to about 600 psia.

13. The method according to claim 1, further comprising the step of recycling a hydrogen-rich fraction from the pressure swing adsorption system in step (d) into the feed mixture passing to the pressure swing adsorption system in step (a).

14. The method according to claim 1, wherein the carbon monoxide in step (e) is desorbed by a vacuum withdrawal step subsequent to a product gas purge step.

15. The method according to claim 1, wherein the purity of the carbon monoxide product is greater than about 99%.

16. A method for producing hydrogen and carbon monoxide from a feed mixture comprising hydrogen, carbon monoxide, carbon dioxide, and methane, which comprises the steps of:
    (a) providing a pressure swing adsorption system having a first stage and a second stage, wherein the first stage contains an adsorption bed comprising an adsorbent having a greater affinity for carbon monoxide than for hydrogen, carbon dioxide, and methane, the second stage contains an adsorption bed comprising an adsorbent having a greater affinity for carbon dioxide, methane, and carbon monoxide than for hydrogen, and the first and second stages are connected in series and each stage contains an inlet end and an outlet end;
    (b) passing the feed mixture through the first stage of the pressure swing adsorption system to separate carbon monoxide as an adsorbed fraction and hydrogen, carbon dioxide, and methane as a non-adsorbed fraction;
    (c) passing the non-adsorbed fraction from step (b) through the second stage of the pressure swing adsorption system to separate carbon dioxide and methane as an adsorbed fraction and hydrogen as a non-adsorbed pure product;
    (d) desorbing carbon dioxide and methane from the first and second stages of the pressure swing adsorption system to form a carbon dioxide-rich fraction; and
    (e) desorbing carbon monoxide from the first stage of the pressure swing adsorption system to form a pure carbon monoxide product.

17. The method according to claim 16, wherein the feed mixture comprises hydrogen in an amount up to about 80%, carbon monoxide in an amount up to about 20%, carbon dioxide in an amount up to about 30%, and methane in an amount up to about 3%.

18. The method according to claim 16, wherein the adsorbent in the adsorption bed in the first stage of the pressure swing adsorption system in step (b) is selected from the group consisting of copper exchanged Y-type aluminosilicate zeolite molecular sieves, copper exchanged alumina, and copper exchanged activated carbon, and mixtures thereof.

19. The method according to claim 18, wherein the adsorbent is copper exchanged Y-type aluminosilicate zeolite molecular sieves.

20. The method according to claim 16, wherein the adsorbent in the adsorption bed in the second stage of the pressure swing adsorption system in step (c) comprises activated carbon and zeolite molecular sieves.

21. The method according to claim 20, wherein the zeolite molecular sieves are an aluminosilicate zeolite selected from the group consisting of type 5A, 10X, 13X zeolite molecular sieves, and mordenites.

22. The method according to claim 16, further comprising the steps of passing the feed mixture through the inlet end of the first stage in step (b), withdrawing the hydrogen product from the outlet end of the second stage in step (c), stopping the flow of feed mixture into the inlet end of the first stage, and desorbing the carbon dioxide and methane in step (d) from a location intermediate between the first and second stages of the pressure swing adsorption system to form a carbon dioxide-rich fraction.

23. The method according to claim 22, wherein the desorbed carbon dioxide-rich fraction is recycled to a hydrocarbon steam reformer.

24. The method according to claim 22, further comprising the step of desorbing the carbon dioxide and methane by purging the second stage with hydrogen gas in a countercurrent direction and purging the first stage with carbon monoxide gas in a cocurrent direction.

25. The method according to claim 24, wherein the purge effluent gases from the first and second stages are withdrawn from a location intermediate between the first and second stages of the pressure swing adsorption system.

26. The method according to claim 16, wherein carbon monoxide is desorbed from the inlet end of the first stage of the pressure swing adsorption system in step (e) under vacuum.

27. The method according to claim 16, wherein the pressure swing adsorption system in steps (b) and (c) are operated at an adsorption pressure in the range from about 150 psia to about 600 psia.

28. The method according to claim 16, wherein the purity of the carbon monoxide product is greater than about 99%.

* * * * *